US009851526B2

(12) United States Patent
Kullgren

(10) Patent No.: US 9,851,526 B2
(45) Date of Patent: Dec. 26, 2017

(54) LENS HOLDER

(71) Applicant: Axis AB, Lund (SE)

(72) Inventor: Fredrik Kullgren, Skanor (SE)

(73) Assignee: Axis AB, Lund (SE)

( * ) Notice: Subject to any disclaimer, the term of this patent is extended or adjusted under 35 U.S.C. 154(b) by 391 days.

(21) Appl. No.: 14/524,576

(22) Filed: Oct. 27, 2014

(65) Prior Publication Data

US 2015/0177475 A1 Jun. 25, 2015

(30) Foreign Application Priority Data

Dec. 20, 2013 (EP) ..................................... 13199145

(51) Int. Cl.
- *B25B 11/00* (2006.01)
- *G02B 7/02* (2006.01)
- *G03B 17/12* (2006.01)

(52) U.S. Cl.
CPC ............. *G02B 7/022* (2013.01); *G02B 7/026* (2013.01); *G03B 17/12* (2013.01); *Y10T 29/49908* (2015.01)

(58) Field of Classification Search
CPC .... B25B 1/00; B25B 3/00; B25B 5/00; B25B 11/00
See application file for complete search history.

(56) References Cited

U.S. PATENT DOCUMENTS

| 5,556,085 A * | 9/1996 | Cyr ........................... B25B 1/22 269/156 |
| 6,184,972 B1 * | 2/2001 | Mizutani ................. G03F 7/707 269/21 |
| 2008/0181594 A1 | 7/2008 | Noguchi |
| 2012/0073153 A1 * | 3/2012 | Petri .................... G02C 13/003 33/200 |
| 2013/0067754 A1 * | 3/2013 | Matsuyama ............. G01B 5/20 33/200 |
| 2015/0177475 A1 * | 6/2015 | Kullgren ................ G02B 7/026 29/505 |

FOREIGN PATENT DOCUMENTS

| JP | 57-66409 | 4/1982 |
| JP | 6-18797 | 1/1994 |
| JP | 2003-29114 | 1/2003 |
| JP | 2005-352386 | 12/2005 |
| JP | 2006-23480 | 1/2006 |
| JP | 2012-93483 | 5/2012 |

* cited by examiner

*Primary Examiner* — Lee D Wilson
(74) *Attorney, Agent, or Firm* — Oblon, McClelland, Maier & Neustadt, L.L.P.

(57) ABSTRACT

The present invention relates to a method, and an arrangement for attaching a lens to a lens holder. The method comprises: arranging a fixing arc of a fixing part around a compressible retainer of the lens holder, inserting an attachment portion of the lens into the compressible retainer, and reducing a radius of curvature of the fixing arc, such that the compressible retainer of the lens holder is compressed around the attachment portion, thereby attaching the lens to the lens holder.

9 Claims, 6 Drawing Sheets

LENS HOLDER

TECHNICAL FIELD

The present invention relates to a method, and an arrangement for attaching a lens to a lens holder.

BACKGROUND ART

When attaching a lens to a network camera different solutions are used. The lens can, e.g., be glued to the camera. Gluing is however harmful to the environment and to the person involved in the gluing. Furthermore, gluing is complicated and involves several steps such as cleaning and curing. Additionally, glue can become dry and lose its gluing capacity.

Another way to attach a lens to a network camera is by screwing a plurality of screws from the camera, radially, towards the lens. A disadvantage with this is that the lens can be mounted askew and that the mounting is time-consuming.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a method for attaching a lens to a lens holder. The method comprises: arranging a fixing arc of a fixing part around a compressible retainer of the lens holder, inserting an attachment portion of the lens into the compressible retainer, and reducing a radius of curvature of the fixing arc, such that the compressible retainer of the lens holder is compressed around the attachment portion, thereby attaching the lens to the lens holder.

This is advantageous in that the method for attaching is self-centering in a radial direction. Furthermore, when attaching the lens and compressing the compressible retainer, there is substantially no transfer in an axial direction. Additionally, the method is advantageous in that it is durable compared to, e.g., gluing. The method is also time and capacity efficient compared to, e.g., gluing and screwing. Furthermore, the force applied on the lens is more uniform compared to other types of attachments.

The method may further comprise the fixing part having a pressing part, the pressing part being at its ends connected to the fixing arc, and the step of reducing further comprising: pressing the pressing part thus reducing the radius of curvature of the fixing arc. An advantage with this is that it is simplifies the step of reducing the radius of curvature of the fixing arc. Another advantage is that it is not possible to remove the fixing part without it showing. If trying to remove the fixing part and then reattaching it, it will show on the fixing part. Thus, the method reduces the risk of tampering with the lens, lens holder, and, if the lens holder is attached to an image sensor, with the camera formed by these parts.

The method may further comprise the fixing part having a plurality of pressing parts, and the fixing arc having a plurality of arc portions, the pressing parts being at their ends connected to the arc portions, and the step of reducing further comprising: pressing the pressing parts thus reducing the radius of curvature of the fixing arc. This is advantageous in that the arc portions slide less against the compressible retainer during the reducing of the radius of curvature.

The step of pressing may further comprise: pressing by means of a predetermined force. This is advantageous in that the method may be automated. Another advantage is that a predetermined force will minimize the risk of damage while ensuring that the attachment is strong enough.

The method may further comprise, before the step of reducing: attaching an image sensor to the lens holder, moving the attachment portion until a desirable distance between the attachment portion and the image sensor is obtained, and/or moving the attachment portion until a desirable rotational angle of the lens is obtained. In one embodiment, the distance that is adjusted by moving the attachment portion is the flange back distance. This is advantageous in that a desirable focus can be obtained throughout the whole zooming range. In one embodiment, the step of moving the attachment portion comprises moving the attachment portion until a depth of field of the camera formed by the lens and the image sensor is maximized.

According to a second aspect, the present invention is realized by a lens holder for attaching a lens. The lens holder comprises: a compressible retainer arranged to receive an attachment portion of the lens, the compressible retainer being arranged to be compressed such that a radius of curvature of the compressible retainer is reduced, thereby attaching the lens to the lens holder.

The compressible retainer may be arranged to be compressed by means of a clamping force.

The compressible retainer may comprise a plurality of projections spaced apart. This is advantageous in that the compressible retainer can be made of a more rigid material than if the compressible retainer were solid.

The plurality of projections may each have a protrusion protruding in a direction parallel with the radius of curvature of the compressible retainer. This is advantageous in that the pressure on the attachment portion from the compressible retainer is distributed even more uniformly.

According to a third aspect, the present invention is realized by an arrangement for attaching a lens to a lens holder. The arrangement comprises: the lens holder according to the second aspect, a fixing part having a pressing part and a fixing arc, the pressing part being at its ends connected to the fixing arc, the fixing arc being arranged to fit around the compressible retainer and, if the pressing part is pressed, a radius of curvature of the fixing arc is arranged to be reduced such that the compressible retainer is compressed.

It is to be noted that the embodiments of the second aspect can be introduced into and are equally applicable to the embodiments of the third aspect.

The arrangement may further comprise the pressing part having two legs, each connected to the ends of the fixing arc, and an intermediate portion, the intermediate portion having a concavity. This is advantageous in that the intermediate portion remains substantially plane during pressing of the pressing part.

The arrangement may further comprise the fixing part being made of metal. This is advantageous in that if somebody tries to remove the fixing part after the pressing part having been pressed, it will be possible to see this on the fixing part. Thus, it reduces the risk of tampering with the camera.

The arrangement may further comprise the arrangement having a fixed mode comprising: the fixing part being closed which comprises the fixing arc having a smaller radius of curvature than when the fixing part is open, such that the compressible retainer of the lens holder is compressed around the attachment portion thereby attaching the lens to the lens holder.

The arrangement may further comprise the arrangement having a calibration mode comprising: the attachment portion being arranged in the compressible retainer, the fixing arc being arranged around the compressible retainer, and the fixing part being open. This is advantageous in that the attachment portion can be moved until a desirable distance between the attachment portion and an image sensor attached to the lens holder is obtained and/or until a desirable rotational angle of the lens is obtained. In one embodiment, the distance that is adjusted by moving the attachment portion is the flange back distance. This is advantageous in that a desirable focus can be obtained throughout the whole zooming range. In one embodiment, the step of moving the attachment portion comprises moving the attachment portion until a depth of field of the camera formed by the lens and the image sensor is maximized.

The arrangement may further comprise the fixing part having a plurality of pressing parts, and the fixing arc having a plurality of arc portions, the pressing parts being at their ends connected to the arc portions, if the ends of the pressing parts are pressed, the radius of curvature of the fixing arc is arranged to be reduced.

The advantages of the first aspect are equally applicable to the second and the third aspect.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which

FIG. 7a is a perspective view of an embodiment of the inventive fixing part.

FIG. 7b is a perspective view of the inventive fixing part of FIG. 7a.

DETAILED DESCRIPTION OF PREFERRED EMBODIMENTS OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
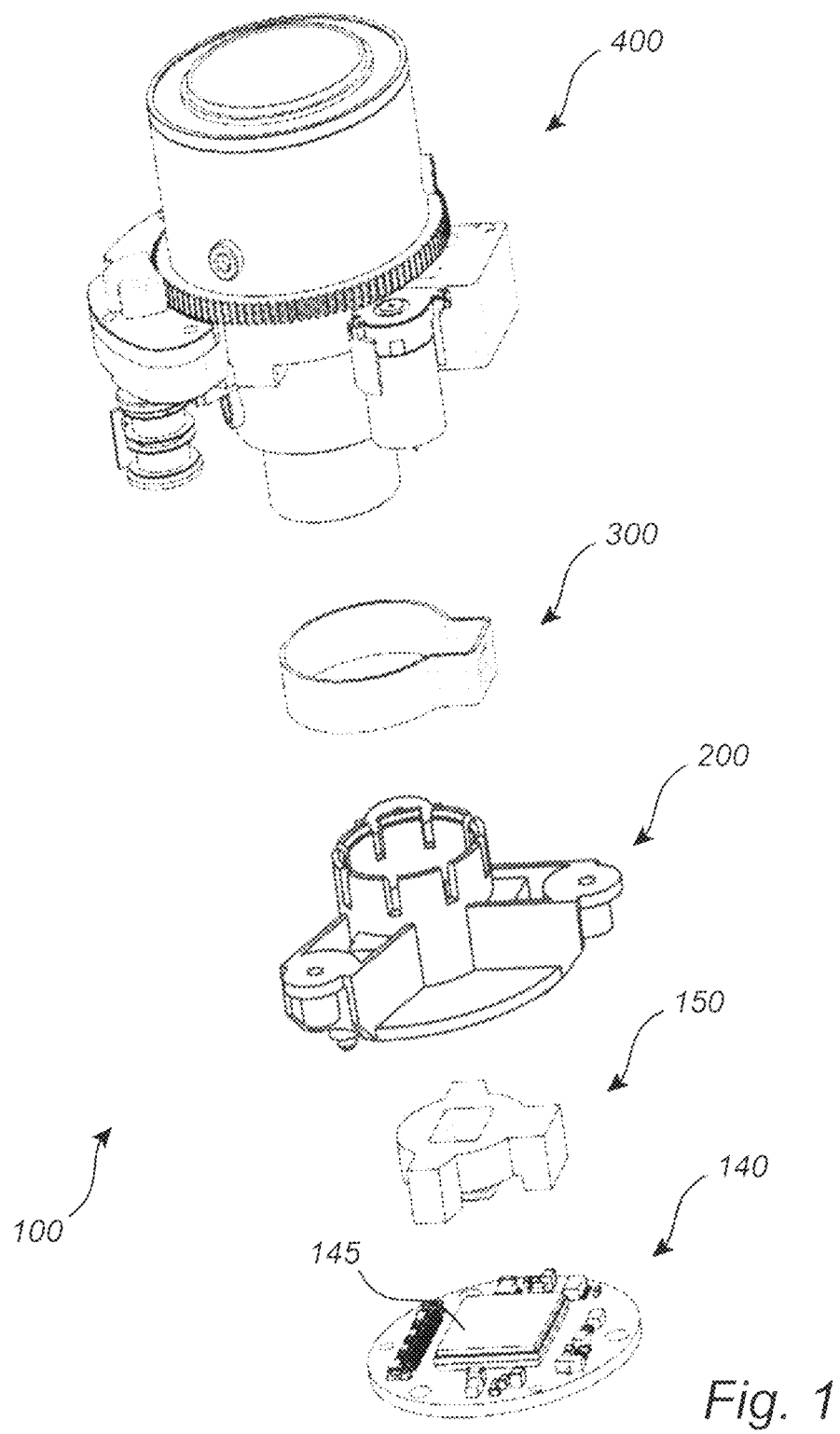
FIG. 1 is an exploded perspective view of an embodiment of the inventive arrangement.

FIG. 1 is an exploded perspective view of an embodiment of the inventive arrangement for attaching a lens to a lens holder. The arrangement 100 comprises a lens holder 200 and a fixing part 300. In some embodiments the arrangement 100 also comprises a lens 400, and a PCB (printed circuit board) 140 having an image sensor 145. In a further embodiment the arrangement also comprises an insulating component 150. The insulating component 150 protects the image sensor 145 and the lens 400 from, e.g., dust.

Figure 2:
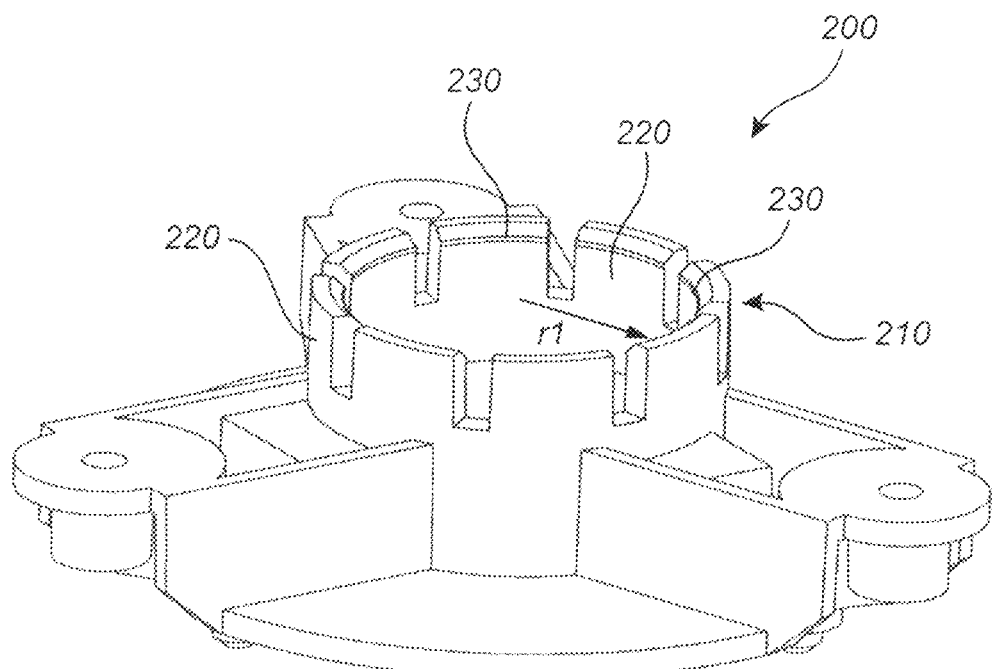
FIG. 2 is a perspective view of an embodiment of the inventive lens holder for attaching a lens.

FIG. 2 is a perspective view of an embodiment of the inventive lens holder for attaching a lens.

The lens holder 200 comprises a compressible retainer 210. The compressible retainer 210 has a plurality of projections 220. The plurality of projections 220 are arranged at distances from each other. In one embodiment, the distances between the plurality of projections 220 are equally long. In another embodiment, the distances between the plurality of projections 220 have different lengths.

In one embodiment, the plurality of projections 220 each have a protrusion 230 protruding in a direction parallel with the radius of curvature of the compressible retainer 210.

When attaching a lens to the lens holder, an attachment portion 410 (see, FIG. 4) of the lens 400 is inserted into the compressible retainer 210.

The compressible retainer 210 can be compressed by means of a clamping force. The clamping force can be a predetermined clamping force. A pressure regulator, other types of pneumatic tools, or any kind of mechanics may be used in order to provide a predetermined clamping force.

When the compressible retainer 210 is compressed, a radius of curvature of the compressible retainer 210 is reduced. When the compressible retainer 210 is compressed, the plurality of projections 220 are pressed towards each other and/or inwards toward a center of the lens holder 200 in a direction parallel with the radius of curvature of the compressible retainer 210. More specifically, the plurality of projections 220 are pressed towards the attachment portion 410 of the lens 400 to be attached to the lens holder 200. In the embodiment having protrusions 230, the protrusions 230 are pressed towards the attachment portion 410.

The lens holder can, e.g., be made of plastic. The plastic can, e.g., include polycarbonate and/or glass fiber.

Figure 3:
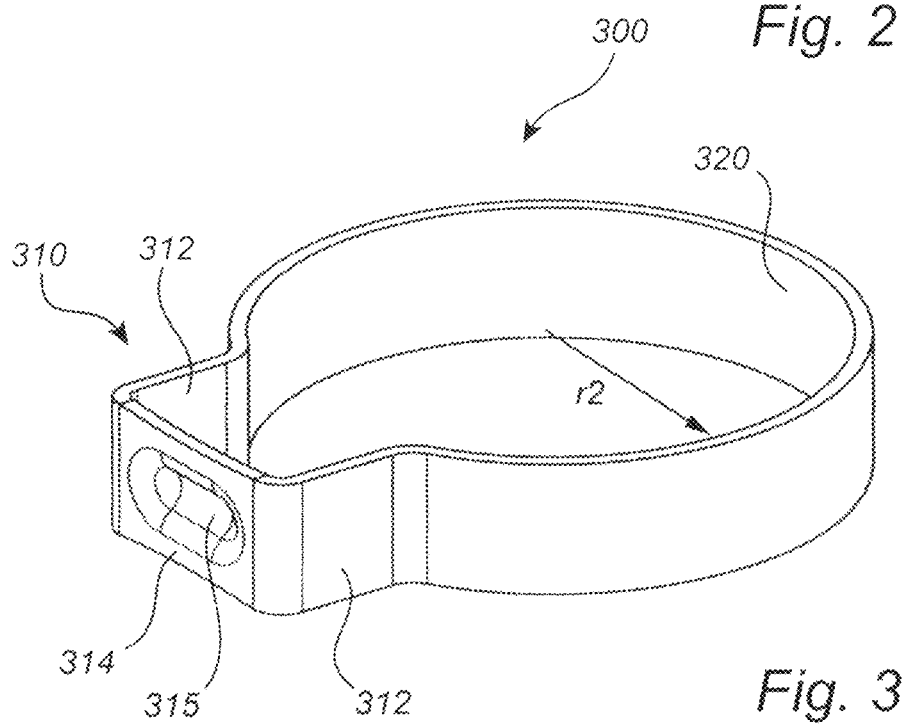
FIG. 3 is a perspective view of an embodiment of the inventive fixing part.

FIG. 3 is a perspective view of an embodiment of the inventive fixing part.

The fixing part 300 has a pressing part 310 and a fixing arc 320. The pressing part 310 has two legs 312. The legs 312 are each connected to the ends of the fixing arc 320. Furthermore, the pressing part 310 has an intermediate portion 314, the intermediate portion 314 having a concavity 315.

The fixing arc 320 is arranged to fit around a compressible retainer, e.g., the compressible retainer 210. If the pressing part 310 is pressed, more specifically if the legs 312 are pressed, a radius of curvature of the fixing arc 320 is reduced such that the compressible retainer 210 is compressed.

The fixing part can be made of metal, e.g., stainless steel. The fixing part can be manufactured by, e.g., bending a strip and welding its ends together or by cutting an appropriately shaped tube. The fixing part can, e.g., have a width in the range of 0.5 mm-3 cm. In one embodiment, the fixing part has a width of 5 mm.

Figure 8:
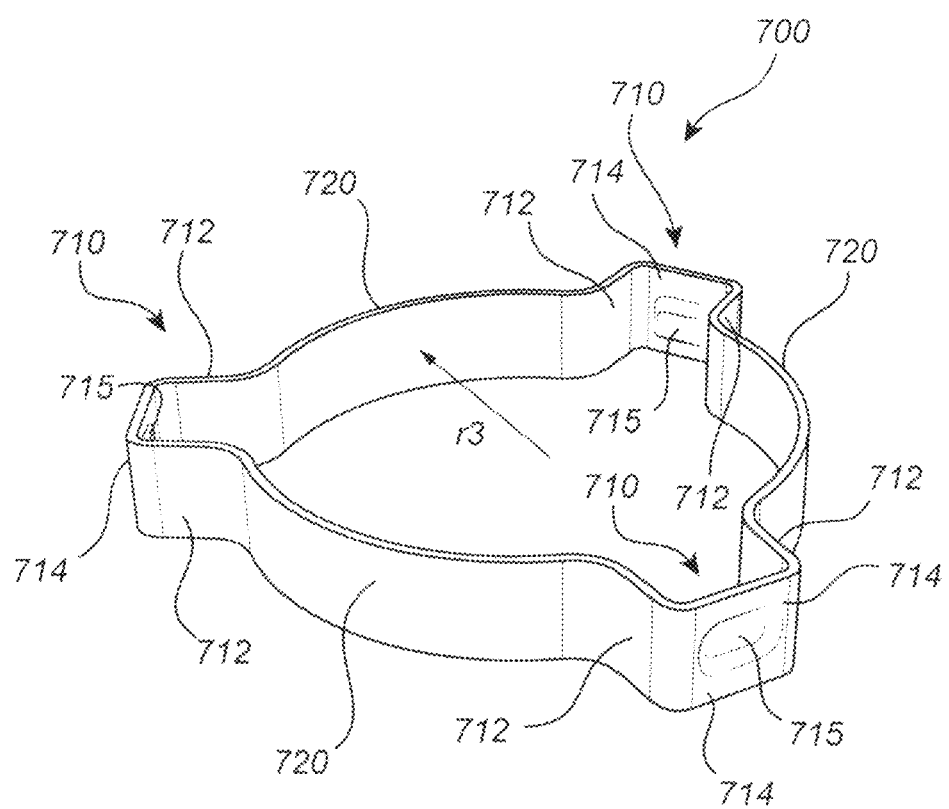
FIG. 8 is a perspective view of an embodiment of the inventive fixing part.

The fixing part 700 can have a plurality of pressing parts 710. This is illustrated in FIG. 8 which is a perspective view of an embodiment of the inventive fixing part. The fixing part 700 has a plurality of pressing parts 710 and the fixing arc has a plurality of arc portions 712. The pressing parts 710 are at their ends connected to the arc portions 720. If the pressing parts are pressed 710, the radius of curvature r3 of the fixing arc is reduced. The legs 712 correspond to the legs 312 and the intermediate 714 portion having a concavity 715 corresponds to the intermediate 314 portion having a concavity 315.

Herein, when referring to fixing arc 320 it is also, where applicable, referred to the fixing arc having the fixing arc portions 720.

Figure 4:
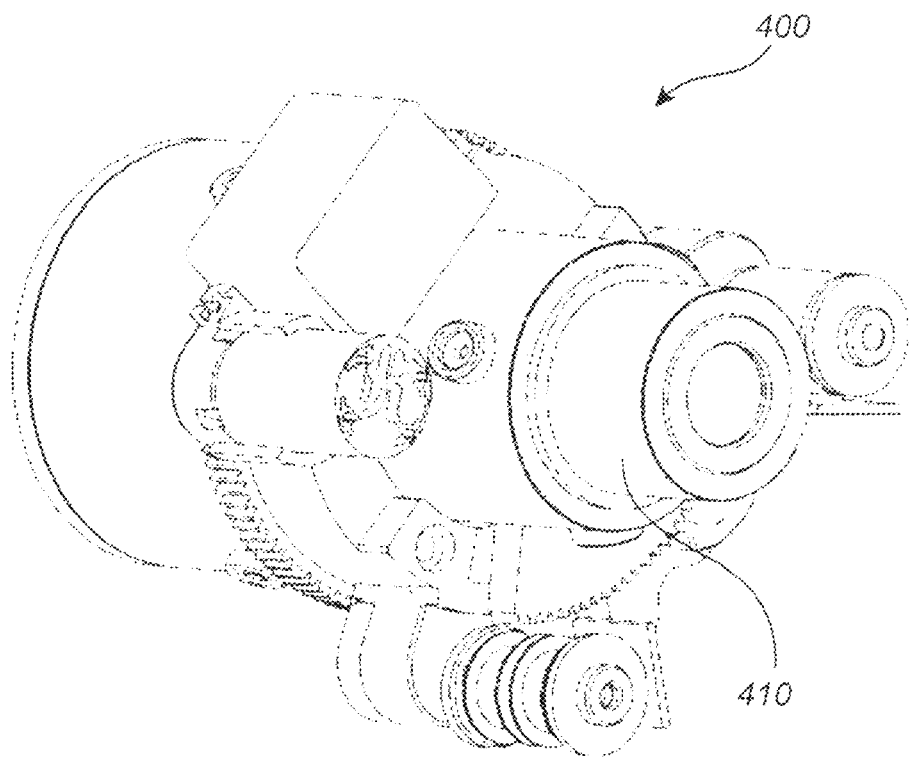
FIG. 4 is a perspective view of a lens.

FIG. 4 is a perspective view of a lens 400. The lens comprises an attachment portion 410. The lens can, e.g., be a wide-angle lens. The lens can be any kind of lens system with an attachment part.

Figure 5:
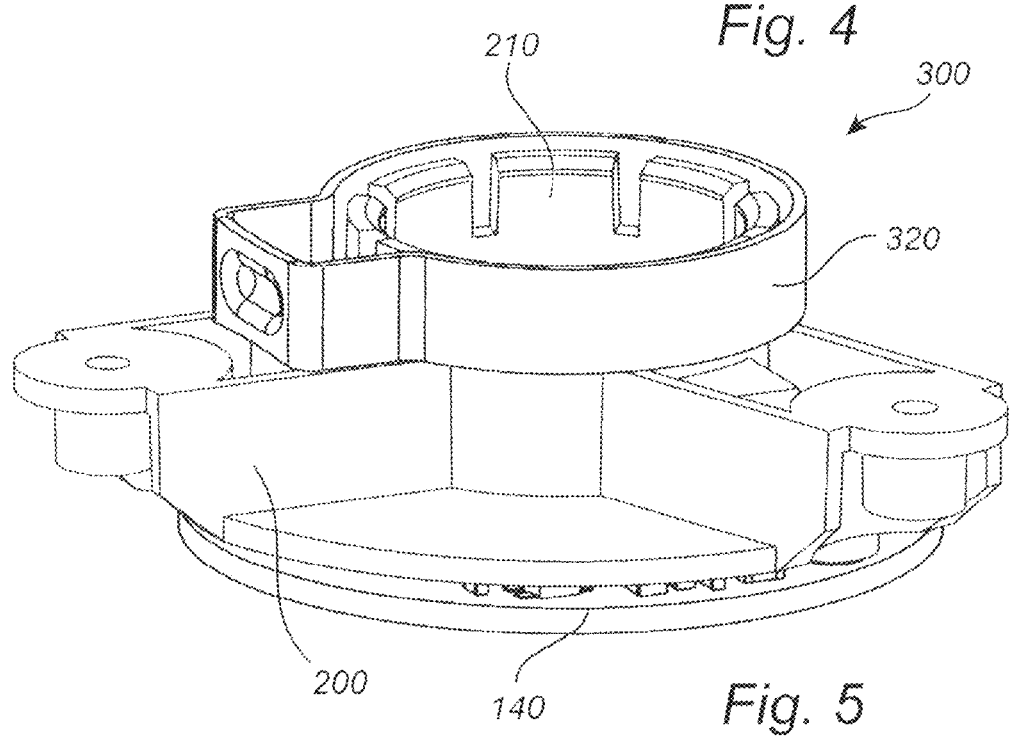
FIG. 5 is a perspective view of an embodiment of the inventive arrangement.

FIG. 5 is a perspective view of an embodiment of the inventive arrangement comprising the fixing part 300 of FIG. 3, the lens holder 200 of FIG. 2, and the image sensor 145 of FIG. 1. The fixing arc 320 is arranged around the compressible retainer 210. The image sensor 145 is attached to the lens holder 200 or is ready to be attached to the lens holder 200. The image sensor can, e.g., be attached to the lens holder by gluing.

Figure 6:
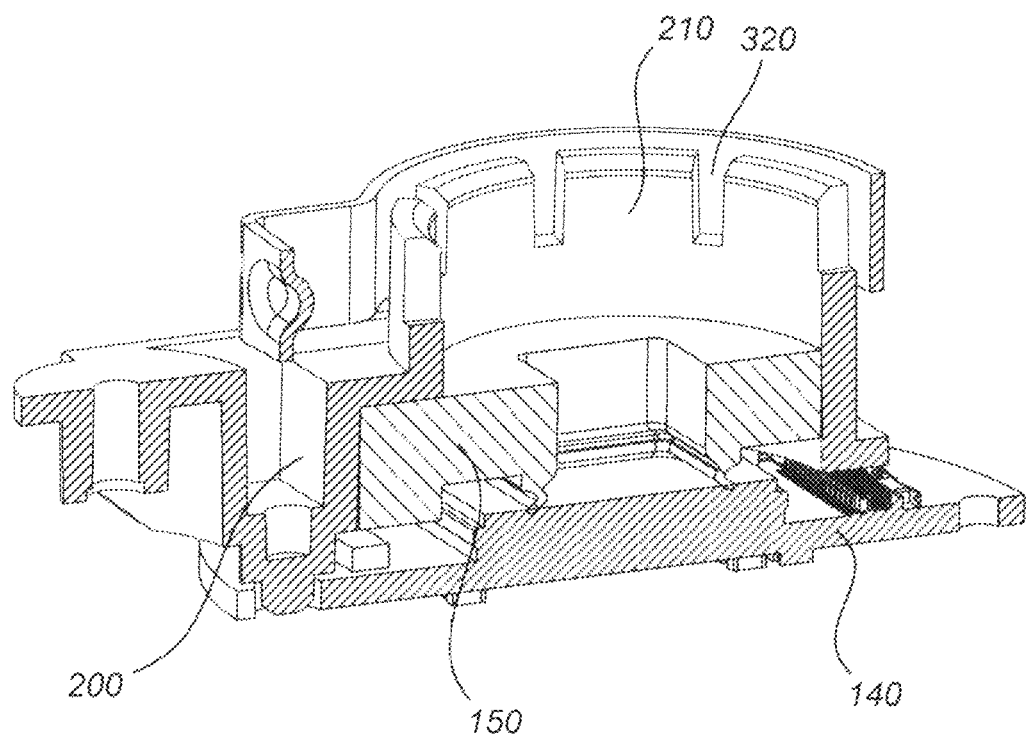
FIG. 6 is a perspective view of a cross-section of the embodiment of FIG. 5.

FIG. 6 is a perspective view of a cross-section of the embodiment of FIG. 5. Also visible here is the insulating component 150 of FIG. 1.

Figure 7:
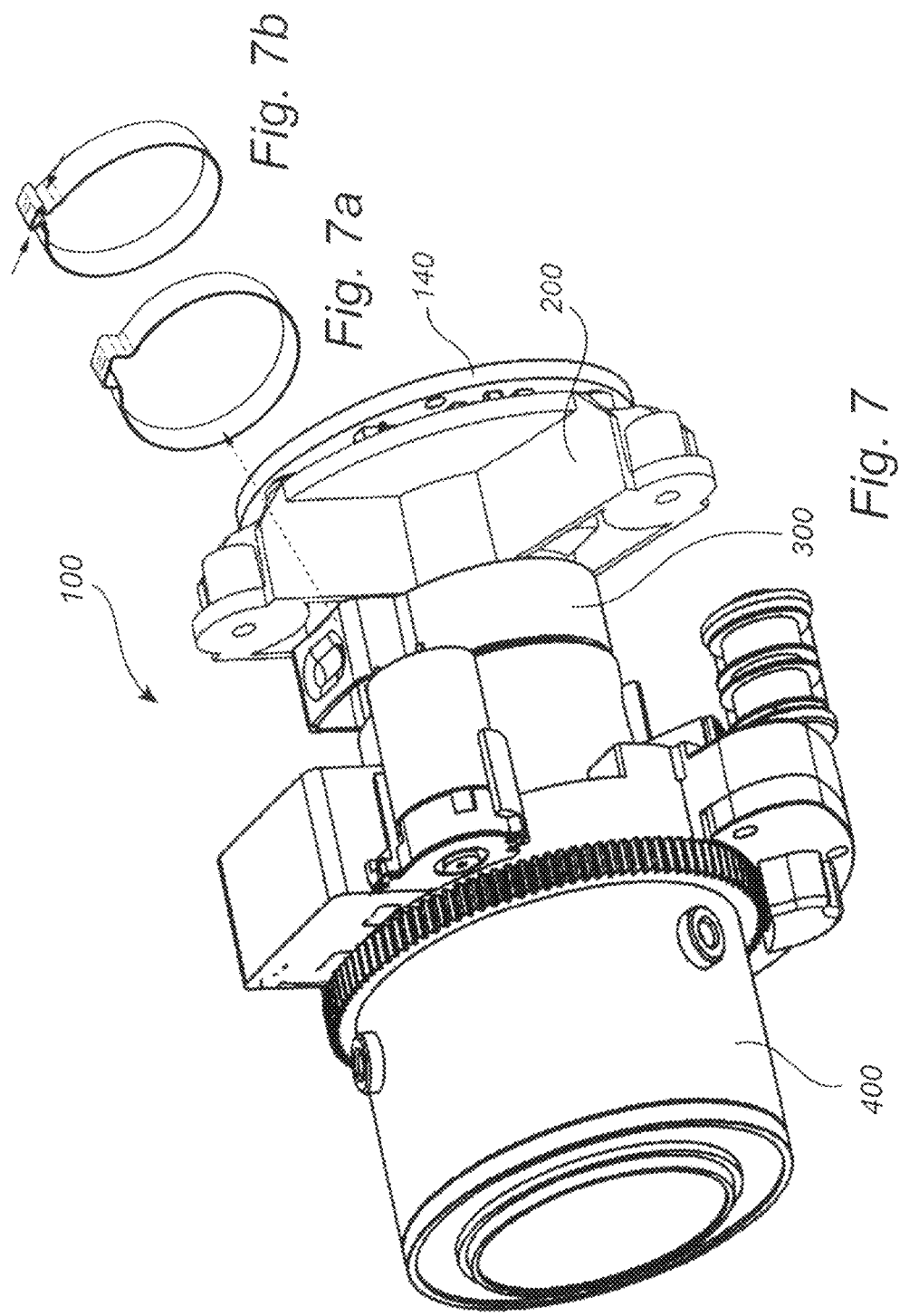
FIG. 7 is a perspective view of an embodiment of the inventive arrangement.

FIG. 7 is a perspective view of an embodiment of the inventive arrangement. The arrangement 100 in FIG. 7 corresponds to the 100 arrangement of FIG. 1 and comprises a lens 400, a fixing part 300, a lens holder 200 and an image sensor 145.

The arrangement 100 is in FIG. 7 in a calibration mode. The calibration mode comprises the attachment portion 410 being arranged in the compressible retainer 210, the fixing part being 300 arranged around the compressible retainer 210, and the fixing part 200 being open. In the calibration mode, the lens 400 and its attachment portion 410 is free to move. The position of the lens 400 in relation to the lens holder 200 can be adjusted by, e.g., rotating the lens 400 or the lens holder 200, or by moving the lens 400 and/or the lens holder 200 towards or away from each other.

The distance between the lens 400 and the image sensor 145 is sometimes referred to as the flange back distance. By adjusting the flange back distance, a desirable focus can be obtained throughout the whole zooming range of the lens 400. In one embodiment, the step of moving the attachment portion comprises moving the attachment portion until a depth of field of the camera formed by the lens and the image sensor is maximized.

The arrangement 100 can be in a fixed mode, as is illustrated by FIG. 7b in combination with FIG. 7 and FIG. 7a. FIG. 7a is a perspective view of an embodiment of the inventive fixing part drawn out from the arrangement of FIG. 7. FIG. 7b is a perspective view of the inventive fixing part of FIG. 7a. The fixing part in FIG. 7b is closed.

The fixed mode comprises the fixing part 300 being closed which comprises the fixing part 300 having a smaller radius of curvature than when open, such that the compressible retainer 210 of the lens holder 200 is compressed around the attachment portion 410, thereby attaching the lens 400 to the lens holder 200. In the fixed mode, the attachment portion 210 and the lens holder 200 are not free to move in relation to each other.

In the following, an embodiment of the inventive method for attaching a lens to a lens holder will be presented with reference to FIGS. 1-8.

A fixing arc 320 of a fixing part 300 is arranged around a compressible retainer 210 of a lens holder 200. An attachment portion 410 of the lens 400 is inserted into the compressible retainer 210. A radius of curvature of the fixing arc 320 is reduced, such that the compressible retainer 210 of the lens holder 20 is compressed around the attachment portion 410, thereby attaching the lens 400 to the lens holder 200. The pressing part 310 of the fixing part 300 is pressed such that the radius of curvature of the fixing arc 320 is reduced. If the fixing part has a plurality of pressing parts and the fixing arc has a plurality of arc portions, then the pressing parts are pressed such that the radius of curvature of the fixing arc is reduced.

The pressing of the pressing part can be performed by means of a predetermined force. A pressure regulator may be used or other types of pneumatic tools, in order to provide a predetermined pressing force.

Before the step of reducing the radius of curvature of the fixing arc, an image sensor may be attached to the lens holder. Then, the attachment portion may be moved until a desirable distance between the attachment portion and the image sensor is obtained.

As an alternative, the lens is attached to the lens holder before the image sensor being attached to the lens holder. The attachment portion is for instance inserted into the lens holder as far as it gets. The radius of curvature of the fixing arc is reduced such that the compressible retainer of the lens holder is compressed around the attachment portion thereby attaching the lens to the lens holder. After that the image sensor is attached to the lens holder. The focus can then be adjusted using a focus mechanism of the lens.

Image based adjustment system (IBAS) can be used for calculating the current focus value of the lens.

It is to be noted that all embodiments and features described in this application are applicable on all aspects of the invention.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. An arrangement comprising:
   a lens holder having a compressible retainer arranged to receive an attachment portion of a lens; and a fixing part having two legs and an intermediate portion, the two legs each being connected at one end to the intermediate portion and at another end to a fixing arc, wherein the fixing arc is arranged to fit around the compressible retainer, and if the two legs are pressed and thereby deformed, a radius of curvature of the fixing arc is arranged to be reduced such that the compressible retainer is compressed around the attachment portion, thereby attaching the lens to the lens holder.

2. The arrangement of claim 1, wherein the intermediate portion includes a concavity.

3. The arrangement of claim 1, wherein the fixing part is made of metal.

4. The arrangement of claim 1, the arrangement having a fixed mode comprising:

the fixing part being closed which comprises the fixing arc having a smaller radius of curvature than when the fixing part is open, such that the compressible retainer of the lens holder is compressed around the attachment portion thereby attaching the lens to the lens holder.

5. The arrangement of claim 1, the arrangement having a calibration mode comprising:

the attachment portion being arranged in the compressible retainer, the fixing arc being arranged around the compressible retainer, and the fixing part being open.

6. The arrangement of claim 1, wherein the fixing part has a plurality of pairs of legs and a plurality of intermediate portions, and the fixing arc has a plurality of arc portions, the pairs of legs are each at one of their ends connected to the arc portions and at another of their ends connected to the intermediate portions, and if the pairs of legs are pressed and thereby deformed, the radius of curvature of the fixing arc is arranged to be reduced.

7. The arrangement of claim 1, wherein the two legs are arranged to be pressed by means of a clamping force.

8. The arrangement of claim 1, wherein the compressible retainer comprises a plurality of projections spaced apart.

9. The arrangement of claim 8, wherein the plurality of projections each have a protrusion, each protrusion protruding in a direction parallel with the radius of curvature of the compressible retainer.

* * * * *